United States Patent [19]
Dunder et al.

[11] 3,873,128
[45] Mar. 25, 1975

[54] DRIVE TRANSMISSION FOR A BICYCLE OR THE LIKE

[75] Inventors: David Dunder, Cupertino; Sheldon Wiley, Los Gatos, both of Calif.

[73] Assignee: Trans World Products, Inc., San Jose, Calif.

[22] Filed: May 29, 1973

[21] Appl. No.: 364,380

[52] U.S. Cl................ 280/236, 74/192, 74/193
[51] Int. Cl......................................... B62m 11/12
[58] Field of Search...... 74/192, 191, 193; 280/236, 280/237, 238

[56] References Cited
UNITED STATES PATENTS

| | | | |
|---|---|---|---|
| 194,870 | 9/1877 | Hancock | 280/236 X |
| 390,216 | 10/1888 | Evans | 74/192 X |
| 657,516 | 9/1900 | Coleman | 74/192 X |
| 863,341 | 8/1907 | Alber | 74/193 |
| 2,424,873 | 7/1947 | Abbrecht | 74/191 |
| 2,956,443 | 10/1960 | Nelson | 280/236 X |

FOREIGN PATENTS OR APPLICATIONS

| | | | |
|---|---|---|---|
| 754,040 | 4/1933 | France | 280/238 |
| 1,375,048 | 9/1964 | France | 74/192 |

*Primary Examiner*—Kenneth H. Betts
*Attorney, Agent, or Firm*—Miketta, Glenny, Poms & Smith

[57] ABSTRACT

A drive transmission for a bicycle or the like including a housing having a pair of spaced right circular cones oppositely mounted and journaled for rotation within the housing. A sprocket is fixedly secured to one end of both of the cones and a first chain operatively engages the pedal sprocket of the bicycle and one of the cone sprockets and a second chain operatively engages the rear wheel sprocket and the other cone sprocket. Means are provided for transmitting rotation of one of the cones to the other. Means may also be provided for changing the position of the aforementioned means with respect to the tapered surfaces of the cones to decrease the ratio between the cones automatically in response to the revolution of the rear wheel of the bicycle. In this manner, the pedal pressure remains uniform and constant regardless of the terrain encountered by the cyclist.

5 Claims, 10 Drawing Figures

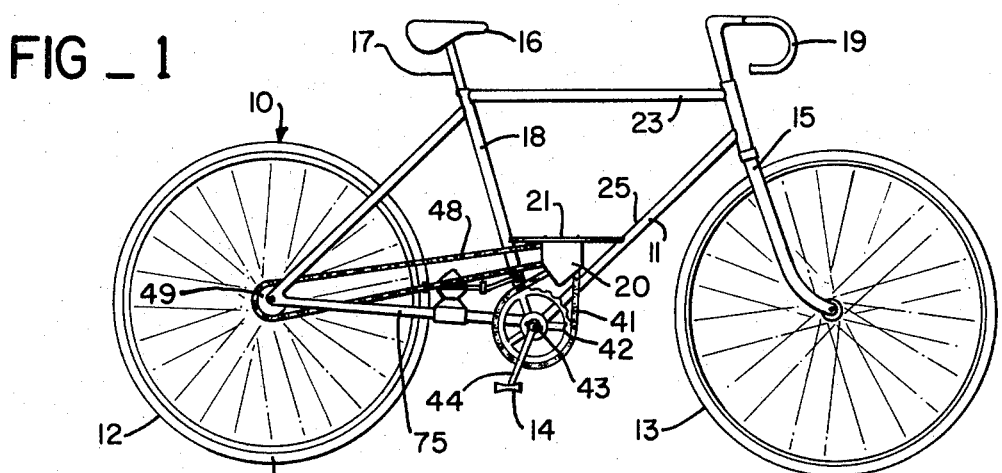
FIG_1
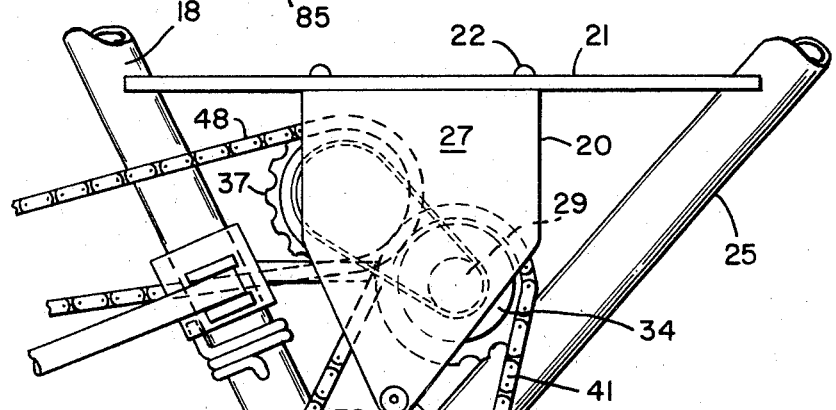
FIG_2
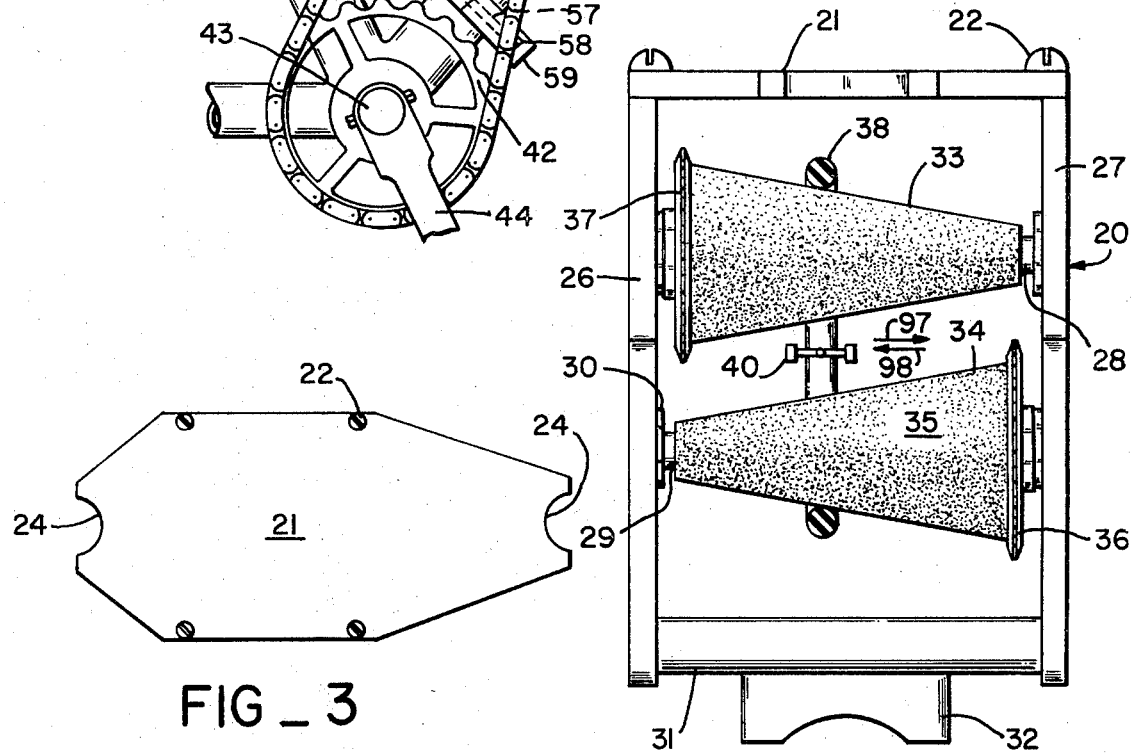
FIG_3
FIG_4

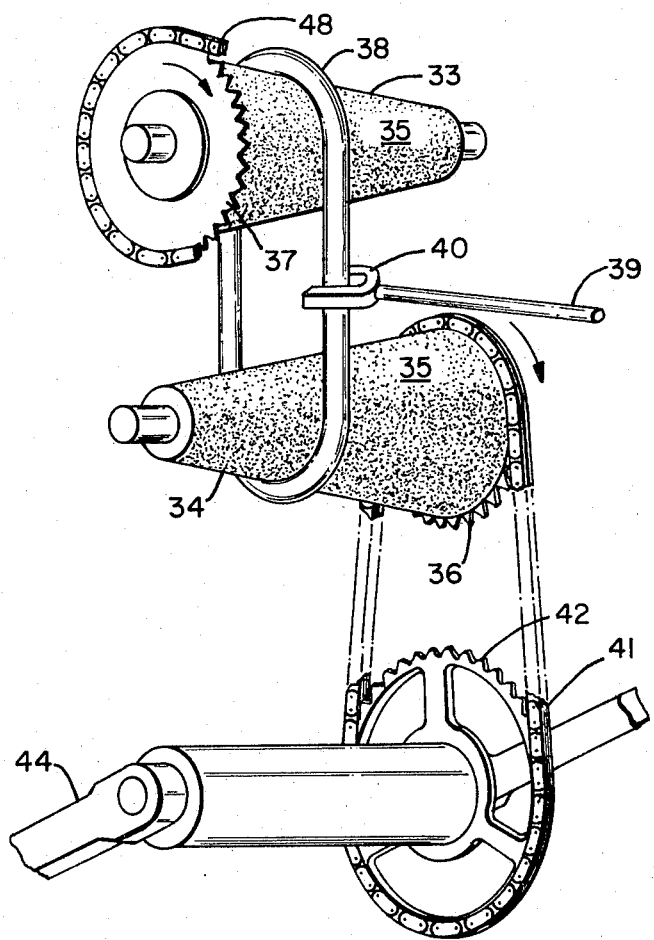
FIG_5
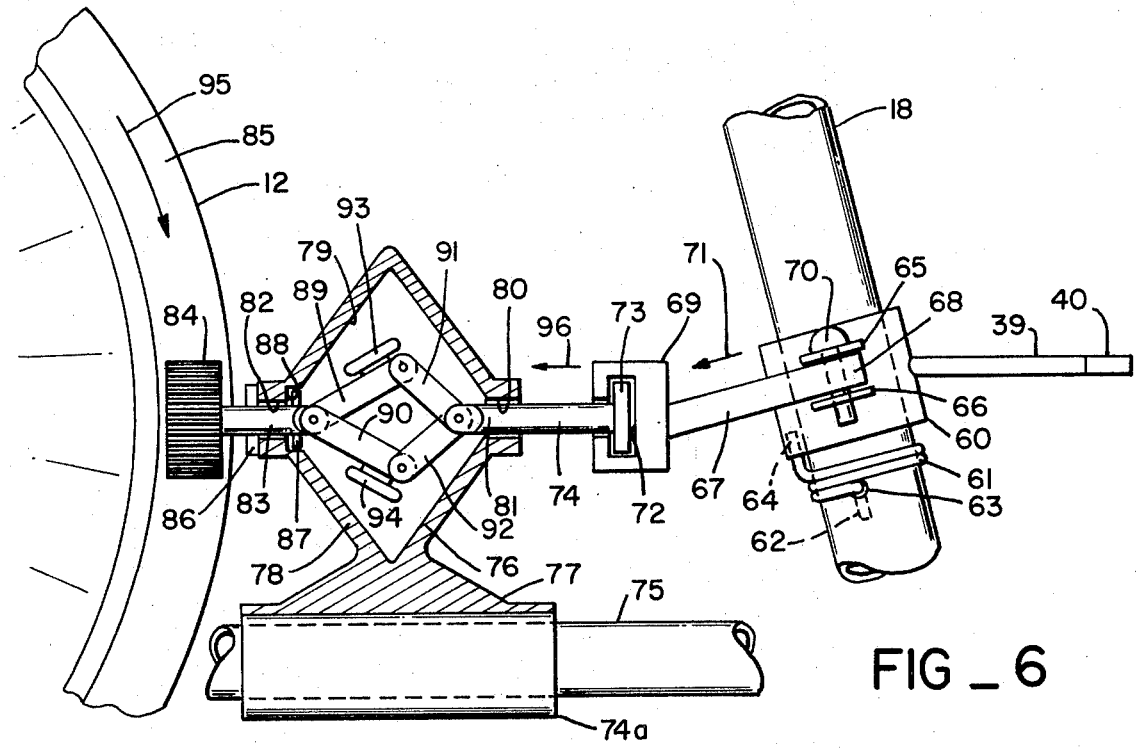
FIG_6

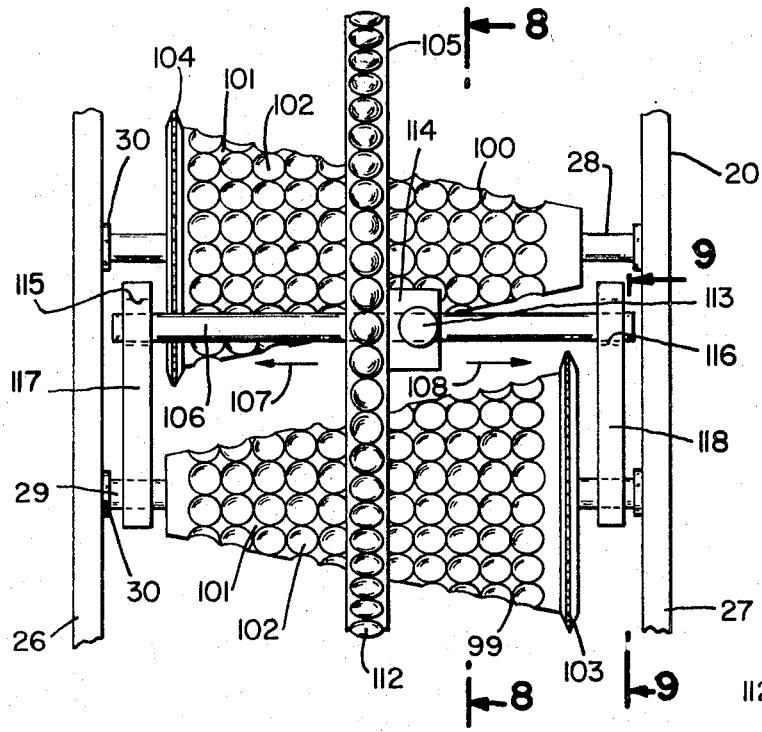
FIG_7
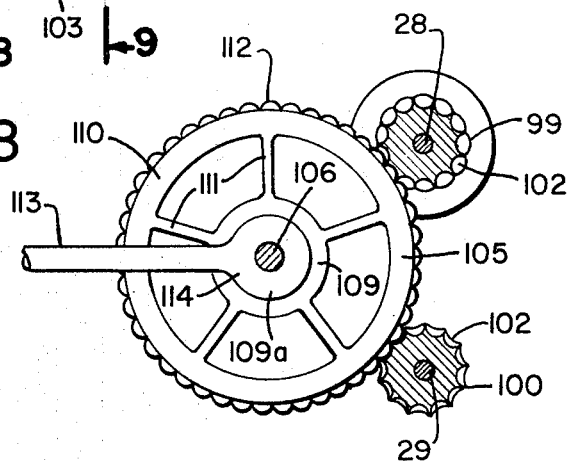
FIG_8
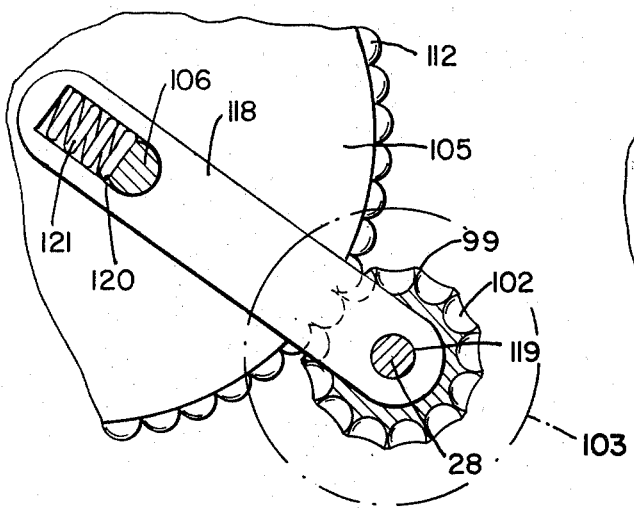
FIG_9
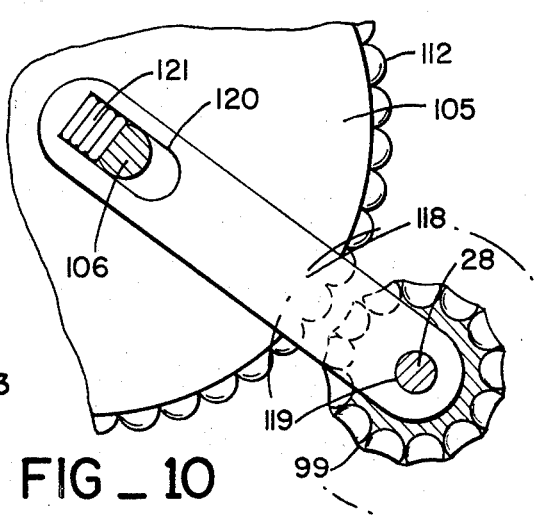
FIG_10

DRIVE TRANSMISSION FOR A BICYCLE OR THE LIKE

BACKGROUND OF THE INVENTION

1. Field of the Invention

The invention relates to drive transmission; and, more particularly, to a drive transmission for a bicycle or the like.

2. Description of the Prior Art

There has been a great revival of interest in recent years in the use of bicycles or the like. This is due in part to the lack of exercise by most people and in part to the pollution caused to the environment by automobiles or the like. This revival has revolved pretty much about multi-speed bicycles, particularly, ten-speed bicycles. These bicycles have means thereon for varying the transmission ratio imparted to the rear wheel of the bicycle so that this ratio can be adjusted in accordance with the speed attained and in accordance with the nature of the terrain encountered, such as a hill of the like. Conventional transmission ratio changing means used today on most five and ten-speed bicycles or the like is the so-called "derailleur" mechanism. This generally involves the use of a manually operated lever to move a chain, during movement of the bicycle, from one sprocket to another sprocket of greater or lesser diameter. Many problems are encountered in the use of such systems since the chain, lever and sprockets must be kept in close alignment to carry out the foregoing operations. There thus exists a need for a system of changing or varying the transmission ratio between the rear wheel of a bicycle or the like and the pedal used to operate the bicycle. Such means should be mechanically efficient yet inexpensive to manufacture and easy to use.

SUMMARY OF THE INVENTION

It is an object of this invention to provide a drive transmission for a bicycle or the like which automatically adjusts the transmission ratio between the rear wheel and the pedal sprocket without the use of levers or other complicated mechanisms.

It is a further object of this invention to provide such a drive transmission which has a relatively infinite number of ratios between the rear wheel and the pedal sprocket.

It is still a further object of this invention to carry out the foregoing objects, while the bicycle is in motion, in a quick, easy and mechanically efficient manner.

These and other objects are preferably accomplished by providing a drive transmission for a bicycle or the like which includes a housing having a pair of spaced circular cones oppositely mounted and journaled for rotation within the housing. A sprocket is fixedly secured to the larger end of both of the cones and a first chain operatively engages the pedal sprocket of the bicycle and one of the cone sprockets and a second chain operatively engages the rear wheel sprocket and the other cone sprocket. Means are provided for transmitting revolution of one of the cones to the other. Means are also provided for changing the position of the aforementioned means with respect to the tapered surfaces of the cones to decrease the ratio between the cones automatically in response to the revolution of the rear wheel of the bicycle. In this manner, the pedal pressure remains uniform and constant regardless of the terrain encountered by the cyclist.

BRIEF DESCRIPTION OF THE DRAWINGS

FIG. 1 is a perspective view of a bicycle incorporating the drive transmission of our invention;

FIG. 2 is a side view of the drive transmission alone of the bicycle of FIG. 1;

FIG. 3 is a top plan view of the mounting plate of the transmission of FIGS. 1 through 3;

FIG. 4 is an end view of the transmission of FIGS. 1 and 2;

FIG. 5 is a perspective view, showing the operation of the drive transmission of FIGS. 1 through 4;

FIG. 6 is a detailed, partly sectional, side view of a portion of the drive transmission of FIGS. 1 through 5;

FIG. 7 is an end view of a modification of the transmission of FIGS. 1 through 6;

FIG. 8 is a view taken along the lines 8—8 of FIG. 7, parts thereof being omitted for convenience of illustration;

FIG. 9 is a view taken along the lines 9—9 of FIG. 7, parts thereof also being omitted for convenience of illustration; and FIG. 10 is a view similar to FIG. 9 showing movement of parts thereof.

DESCRIPTION OF THE PREFERRED EMBODIMENTS

Referring now to FIG. 1 of the drawings, a bicycle 10 is shown having a frame 11, a rear driving wheel 12, a front wheel 13 and a pedal 14, the bicycle 10 also includes a fork 15 interconnecting the front wheel 13 to frame 11 and a seat 16 mounted on a seat post 17 secured to the tubing 18 of frame 11. Handlebars 19 are mounted at the top of fork 15 to complete bicycle 10.

The foregoing has described in brief detail the conventional portions of a bicycle. The novel feature of the bicycle 10 of my invention includes a housing 20 (see particularly FIG. 2) depending from a top mounting plate 21 (see FIG. 3) which is secured thereto by screws 22 or the like. This plate 21 extends below tubular member 23 of frame 11 as shown. Thus, plate 21 (see FIG. 3) may include cut-out portions 24 at each end to straddle the tubing 18 and the tubing 25 of frame 11 as shown in FIG. 1.

As shown in FIGS. 2 and 4, housing 20 includes a pair of spaced side plates 26, 27 extending downwardly from plate 21. Screws 22 secure plate 21 to plates 26, 27. A pair of spaced shafts 28, 29 extend between plates 26, 27 and are mounted for rotation therein by means of suitable bearing members 30. The lower ends of plates 26, 27 are fixedly secured by a tubular member 31 which may be bolted or the like to plates 26, 27. A yoke member 32 is carried at generally the midpoint of member 31 for straddling tubing 25 of frame 11 (see FIG. 2).

As can be seen in FIG. 4, a pair of right circular cones 33 and 34 are keyed for rotation with shafts 28, 29, respectively. These cones 33, 34 are thus rotatable about their central longitudinal axes and oppositely mounted on their respective shafts as shown in FIGS. 4 and 5. The outer peripheral surface 35 of each cone may be ribbed, roughened or textured as shown. Of course, surfaces 35 may be smooth, if desired, but are preferably as shown in FIGS. 4 and 5.

A first sprocket 36 is fixed for rotation on shaft 29 and a second sprocket 37 is fixed for rotation on shaft 28. A speed change belt 38, such as an endless resilient O-ring or the like, extends about the outer peripheral surfaces 35 of cones 33, 34 and is in driving engagement therewith (see also FIG. 5).

A speed change lever 39, the particular structure and function of which will be described further hereinbelow, has a forked end 40 which straddles therebetween belt 38. As can be clearly seen in FIG. 4, lever 39 is movable within the space formed between cones 33, 34 transverse of the longitudinal axes of cones 33, 34 (i.e., in the direction of the arrows 97, 98).

Referring once again to FIG. 1 and also to FIG. 5, a chain 41 extends about cone sprocket 36 and a pedal sprocket 42 which is fixedly secured to a pedal shaft 43 operatively connected to pedal supports 44 carrying pedals 14 at their lower ends. As pedals 14 are rotated, pedal sprocket 42 is rotated in the direction of the arrow in FIG. 5. This in turn rotates cone sprocket 36 in the direction indicated and thus cone 34. Since belt 38 is in driving engagement with cones 33, 34, the rotation of cone 34 also rotates cone 33 in the direction indicated. Cone sprocket 37 is thus rotated also in the direction indicated (see also the arrows in FIG. 2).

A chain 48 extends about cone sprocket 37 and leads to the rear wheel 12 (FIG. 1). This chain 48 extends about rear wheel sprocket 49 for rotating the rear wheel 12 of bicycle 10 as is well known in the bicycle art. The particular structure for imparting rotation from sprocket 49 to wheel 12 is well known in the bicycle art and further description is deemed unnecessary.

As shown in FIG. 2, the free ends of the yoke member 32 may include threaded apertures 56 therein for receiving the threaded shafts 57 of bolts 58 so that, by passing bolts 58 through suitable apertures in locking plate 59, the yoke member 32 may be securely mounted to tubing 25.

Referring now to FIG. 6, as particularly contemplated within the present invention, means are provided for varying the ratio between cones 33 and 34. In the exemplary embodiment, such means comprises the aforementioned speed change lever 39 (see FIG. 6) which includes the bifurcated fork portion 40 engaging belt 30 as previously described. Lever 39 is integral with and extends from a sleeve member 60 which encircles tubing 18. Means are provided for retaining sleeve member 60 at a suitable point on tubing 18 and for selectively moving member 60 in the manner indicated above. Such means includes a spring 61 which encircles tubing 18 below sleeve member 60 and has one end 62 securely fastened within an aperture 63 in tubing 18. The other end 64 is retained within sleeve member 60 between the inside wall thereof and the outside of tubing 18 by any suitable means. A pair of spaced brackets 65, 66 extend from sleeve member 60 and are integral therewith. A rod member 67, having an aperture 68 in one end and a head portion 69 at the other end, is pivotally connected to sleeve member 60. This is accomplished by means of a pivot pin 70 or the like which extends through suitable apertures in brackets 65, 66 and the aperture 68 in rod member 67. Pin 70 securely clamps brackets 65, 66 so that when rod member 67 is pulled in the direction of arrow 71 against the action of spring 61, the sleeve member 60 is rotated (in a direction out of the drawing) to thus move lever 39 accordingly.

Head portion 69 includes a T-shaped slotted opening 72 therein adapted to receive the head 73 of a T-shaped member 74. A second sleelve member 74a is fixedly mounted on tubing 75 and includes housing 76 extending upwardly therefrom. Housing 76 includes a base portion 77 and an upwardly extending generally diamond-shaped portion 78 having a like configured inner chamber 79. Of course, housing 76 and chamber 79 may be of any suitable configuration.

A first opening 80 communicates with the interior of chamber 79 and receives the elongated portion 81 of member 74 therethrough. A second opening 82 in housing 76 opposite first opening 80 also communicates with the interior of chamber 79 and receives a shaft 83 therethrough. Shaft 83 carries a generally cylindrical generator in the form of splined drive member 84 which is in abutting engagement with the tire 85 of rear wheel 12. A pair of spaced stop members 86, 87 are fixedly mounted on shaft 83 on each side of opening 82 as shown. Stop member 86 thus abuts against the portion of housing 76 leading into opening 82 while stop member 87 abuts against shoulders 88 formed on the interior of housing 76. A pair of arms 89, 90 are pivotally connected at one end to shaft 83 and at the other end to a similar pair of arms 91, 92 which are in turn pivotally connected to member 74. A pair of weights 93, 94 are fixedly mounted on arms 89, 90 respectively.

It can be seen that when rear wheel 12 is rotated in the direction of arrow 95 as discussed hereinabove, drive member 84 is turned or rotated which in turn rotates hinged arms 89 through 93 (in a direction leading into the drawing, for example). Since arms 89 through 93 are hingedly connected, they swing out or separate as they rotate (i.e., as shown in FIG. 6 — their normal inactive position would be flattened, i.e., arms 89, and 91 generally coaxially aligned and generally parallel to arms 90 and 92 which would also be generally coaxially aligned). As the arms 89 through 92 spread out and separate, member 74 is pulled in the direction of arrow 96. By means of engagement of head 73 in head portion 69 of member 67, the member 67 is pulled in the same direction (i.e., arrow 71). This pivots sleeve member 60, as discussed hereinabove, which in turn moves lever 39. The fork portion 40 of lever 39 moves the trapped belt 38 in the direction of arrow 97 in FIG. 4. Weights 93, 94 cause the arms 89 through 92 to separate under centrifugal force. The spring 61 assists in returning member 38 in the direction of arrow 98 when rotation of drive member 84 is stopped.

The movement of speed change belt 38 decreases the ratio between the two cones 33, 34. As the speed of the rear wheel 12 continues to increase and belt 38 reaches the center of both cones 33, 34 (as shown in FIG. 4), this ratio becomes about 1:1 Whenever the speed of rear wheel 12 increases or decreases, it activates the speed change lever 39 in the proper direction (i.e., arrow 97 in to FIG. 4 when the speed increases and the arrow 98 in FIG. 4 when the speed decreases). This causes the pressure required to rotate the pedal sprocket to remain uniform and constant regardless of the terrain encountered by the cyclist.

The weight of weights 93, 94 and their placement on arms 89, 90 may of course be varied. Also, although a totally automatic means has been described for moving belt 38 with respect to cones 33, 34, it is within the purview of this invention that handle 39 may be manually moved. That is, as shown in FIG. 6, instead of the member 74 and the elements associated with housing 76, and generator 84, the member 67 may be located on the frame 11 so that the cyclist can move it manually or actuate it by a cable or the like, when desired. Suitable means may also be provided for click-stopping the member 67 (and thus lever 39) and resiliently bracing member 67 into its click-stopped positions.

Although we have disclosed a preferred embodiment hereinabove wherein a belt extends about a pair of spaced cones, as particularly contemplated within the present invention, alternate cone driving means may include, as shown in FIG. 7, a pair of spaced right circular cones 99, 100 similar to cones 33, 34 of FIGS. 1 through 6 keyed for rotation with shafts 28, 29, respectively. Like numerals refer to like parts of FIGS. 1 through 6. The outer peripheral surfaces 101 of cones 99, 100 include a plurality of spaced generally circular indentations 102 (see also FIG. 8) which may be aligned in spaced rows as shown. Sprockets 103 and 104, similar to sprockets 36 and 37 previously discussed, are mounted on shafts 28 and 29 for rotation therewith.

Instead of belt 38 previously disclosed, a generally circular driving wheel 105 (see particularly FIG. 8) is slidably mounted on a shaft 106 and movable in the direction of arrows 107, 108 as will be discussed further hereinbelow. Wheel 105 includes a central hub 109 through which shaft 106 extends and an outer annular member 110 interconnected to hub 109 by a spider 111. Hub 109 may have a race 109a with bearings therein. The outer periphery of annular member 110 is comprised of a plurality of spaced protrusions, 112, such as ball bearings mounted in a race or the like, which mate with the indentations 102 in cones 99, 100. That is, the spacing between the indentations 102 is related to the spacing between protrusions 112. In this manner, when one of the cones is rotated with respect to the other, the protrusions 112 disposed in the indentations in the cone being rotated, rotates wheel 105 which in turn rotates the other cone by means of protrusions 112, indentations 102.

In place of the speed change lever 39 previously described, a lever 113 is provided with is similar in all respects to the arrangement described hereinabove, with respect to FIG. 6 except that, in place of forked portion 40, a sleeve member 114 is slidably mounted on shaft 106 and integral with the hub 109. Thus, movement of lever 113 as described previously moves hub 109 in the direction of the arrows 107, 108.

The free ends of shaft 106 pass through apertures 115, 116 formed in a pair of cams 117, 118, respectively. These cams 117, 118 (cam 118 being shown in FIG. 9) have one-way clutch centers 119 through which the respective shaft passes (i.e., shaft 28 in FIG. 9). In this embodiment, chain 41 of FIG. 5 would pass about the sprocket 103 of cone 99. When the pedals 14 are rotated as previously described to rotate pedal sprocket 42, the sprocket 103 is rotated. Normally, shaft 106 rotates freely in the slotted aperture 120 while shaft 28 rotates within one-way clutch center 119. However, when the bicycle is pedalled backwards, the one-way clutch center 119 is activated to stop the rotation of shaft 28 (of this cone 99) with respect to wheel 105. Shaft 106, which normally biases wheel 105 against cones 99, 100 by means of a compression spring 121 associated with slot 120 (FIG. 9), is thrown in a direction away from shaft 28 to FIG. 10 position against compression spring 121 which of course, normally biases wheel 105 into engagement with cones 99, 100. Since wheel 105 is carried on shaft 106, it disengages from cones 99, 100. The aforementioned speed change mechanism is then activated to move the wheel 105 along shaft 106 as discussed hereinabove. Of course, any suitable mechanism may be provided for disengaging wheel 105 from cones 99, 100.

A positive drive is thus presented between sliding wheel 105 and cones 99, 100. The motion of one of the cones is transferred to the other by means of wheel 105. The speed change mechanism moves wheel 105 back and forth in direct relationship to the speed of rear wheel 12 as discussed hereinabove with respect to FIG. 6.

Since sliding wheel 105 rotates on ball bearings in race 109a, very little friction is present for sliding wheel 105 along shaft 106. As long as the bike pedals 14 are going in a forward direction, the gear ratio between cones 99 and 100 will not change. When the pedals 14 are coasting, no change takes place — bicycle 10 merely coasts. However, when pedals 14 are kicked backwards, the aforementioned speed change mechanism sets the sliding wheel 105 in the correct position to engage the proper gear ratio.

It can be seen that we have described a drive transmission for a bicycle or similar vehicle wherein a constant but limited source of power is transmitted by a pair of oppositely mounted cones to a driven wheel which wheel requires an everchanging gear ratio. This ratio may be varied by the speed of the driven wheel itself.

The drive transmission disclosed herein is sturdier than the known derailleur systems now in use on multi-speed bicycles. It is rugged, compact, has fewer moving parts and may be quickly and easily mounted on any existing bicycle. The drive transmission of our invention can withstand violent shock and repeated use without going out of alignment. Shifting with the transmission of our invention may take place and automatically and smoothly while the bicycle is being pedaled under full power. The cyclist is always in the right gear at the right time, from a standing start to climbing and descending. By the time a rider of a conventional multi-speed bike having a conventional derailleur system thereon has completed his shifting cycle, the rider of the bicycle of our invention will be far out in front without every having to exert excess force on the pedals, or crank rapidly in order to catch up with the rear wheel. Pedaling with the bicycle of our invention may be done at a medium, comfortable rate at all times no matter what type of terrain is encountered. For example, the drive transmission of our invention results in a 1:5 ratio on the high gear side. That is, turning pedals 14 one full turn rotates the rear wheel 12 five full turns. These ratios are appreciably better than the ratios obtained with the derailleur system of conventional 10-speed bicycles. Such ratios generally range from a high-gear ratio of less than 1:4 to a low-gear ratio of more than 1:1. Thus, the drive transmission of my invention is more flexible.

Although the housing 20 is shown as mounted on bicycle 10 in a particular location, the housing 20 may be located at any suitable position.

It can be seen from the foregoing that I have described a drive transmission for a bicycle or the like which is more flexible and more efficient than conventional bicycle drive transmissions. Further, a wider range of ratios is present over conventional multi-speed bicycles between the pedals and the rear wheel on which the drive transmission of my invention is mounted.

I claim:

1. In a bicycle having at least a frame, a rear driving wheel having a rear wheel sprocket mounted for rotation on said frame, a front wheel freely rotatable on said frame, and a pedal sprocket journaled for rotation in said frame, said bicycle including:

a housing mounted on said frame;

a pair of generally right circular cones journaled for rotation in said housing, said cones being spaced from one another and rotatable about their longitudinal axes, one of said cones being tapered in a direction opposite the tapering of the other of said cones with their longitudinal axes being generally parallel to each other;

cone rotation transmission means associated with said housing operatively engaging both of said cones for transmitting rotation of one of said cones to the other of said cones;

cone ratio varying means associated with said housing operatively engaging said cone rotation transmission means for varying the engagement thereof along the outer surfaces of said cones in a direction generally parallel to the longitudinal axes of said cones and thus varying the ratio of revolution between said cones;

each of said cones having a sprocket fixed for rotation therewith, the axes of rotation of said sprockets being generally coincident with the axis of rotation of each of said cones, the outer surfaces of each of said cones being textured and said cone rotation transmission means including an endless belt extending about the outer surface of both of said cones in a direction generally normal to the longitudinal axes of said cones; and said cone ratio varying means including a lever having one end engaging said belt for selectively varying the engagement of said belt with said cones, and said cone ratio varying means further including motion generating means operatively engaging the rear wheel of said bicycle for converting rotation of said rear wheel to said lever.

2. In the bicycle of claim 1 wherein said motion generating means includes a motion generator in rotatable driving engagement with said rear wheel, a shaft extending from said motion generator, a pair of levers fixedly connected at one end to said motion generator shaft and at the other end to a like pair of levers, said last-mentioned levers fixedly connected at their free ends to an elongated member pivotally connected to said levers, and a plurality of weighted elements operatively connected to at least two of said levers, the separation of said hinged levers resulting in movement of said elongated member in an axial direction to thereby pivot said levers.

3. In a bicycle having at least a frame, a rear driving wheel having a rear wheel sprocket mounted for rotation on said frame, a front wheel freely rotatable on said frame, and a pedal sprocket journaled for rotation in said frame, said bicycle including:

a housing mounted on said frame;

a pair of generally right circular cones journaled for rotation in said housing, said cones being spaced from one another and rotatable about their longitudinal axes, one of said cones being tapered in a direction opposite the tapering of the other of said cones with their longitudinal axes being generally parallel to each other;

cone rotation transmission means associated with said housing operatively engaging both of said cones for transmitting rotation of one of said cones to the other of said cones;

cone ratio varying means associated with said housing operatively engaging said cone rotation transmission means for varying the engagement thereof along the outer surfaces of said cones in a direction generally parallel to the longitudinal axes of said cones and thus varying the ratio of revolution between said cones; and each of said cones having a sprocket fixed for rotation therewith, the axes of rotation of said sprockets being generally coincident with the axis of rotation of each of said cones, the outer surface of said cones including a plurality of spaced depressions therein, and said cone rotation transmission means being a wheel having a plurality of spaced protuberances on its outer periphery extending in a direction toward the surfaces of said cones, each of said protuberances having an outer configuration generally the same as the inner configuration of each of said depressions and the spacing between adjacent protuberances being generally the same as the spacing between adjacent depressions.

4. In the bicycle of claim 1 wherein said depressions are aligned in a plurality of spaced rows extending in a direction generally normal to the longitudinal axes of said cones and said protuberances lie in a plane generally normal to the longitudinal axes of said cones.

5. In the bicycle of claim 4 wherein said wheel includes a hub slidably and rotatably mounted on a shaft, said cone ratio varying means operatively engaging said hub, and one of said cones including shaft disengaging means thereon operatively engaging said shaft for permitting rotation of said last-mentioned cone in one direction in driving engagement with said wheel and non-rotation of said last-mentioned cone in the opposite direction to disengage said wheel from engagement with both of said cones.

* * * * *